United States Patent Office 3,835,037

Patented Sept. 10, 1974

3,835,037

PURIFICATION OF AROMATIC HYDROCARBONS

John Anthony Fairweather and Ronald James Dalton, Stockton-on-Tees, England, assignors to Imperial Chemical Industries Limited, London, England No Drawing. Filed July 17, 1972, Ser. No. 272,497
Int. Cl. C10g *25/04;* C07c *7/02*
U.S. Cl. 208—260 4 Claims

ABSTRACT OF THE DISCLOSURE

The aromatics-containing product obtained after reforming of naphtha and subsequent solvent extraction is treated with a clay e.g. bentonite at relatively low temperatures to remove olefinic impurities.

This invention concerns processes for the production of aromatic hydrocarbons (particularly benzene, toluene and xylenes) from mixed hydrocarbon feedstocks, for instance a naphtha fraction from petroleum or a gasoline by-product stream from naphtha cracking.

Basically such processes comprise three main stages. The first stage is reforming of a naphtha feedstock in which cyclic and non-cyclic hydrocarbons having at least 6 carbon atoms are aromatised to give a hydrocarbon product of higher aromatic content than the naphtha feedstock. Alternatively, a hydrocarbon product of high aromatic content may be obtained from naphtha pyrolysis. The second stage is a solvent extraction stage in which the product obtained from the reforming stage and/or the naphtha pyrolysis stage is contacted with a solvent that selectively extracts the aromatic hydrocarbons, a suitable solvent being N-methyl pyrrolidone. The third stage is removal of solvent and fractional distillation to split the mixture of aromatic hydrocarbons into its separate components, so producing as examples, pure benzene, toluene and mixed xylenes.

The purity standards, or product specifications as they are called, which producers of aromatic hydrocarbons require to meet are very demanding and there are certain impurities that may originate in the reforming stage which are particularly objectionable in the final purified aromatic hydrocarbons even in very low concentrations such as a few parts per million. These impurities are detected by the various Acid Wash colour tests and have been shown to be olefinic in character. Thus, notwithstanding the very high efficiencies achieved in the solvent extraction stage of commercial installations, it has been the usual practice to interpose between the solvent extraction stage and the fractional distillation train a clay-treatment stage, that is, a stage in which the extracted mixed aromatic hydrocarbons are passed through a bed of a suitable clay material of which there are a number of proprietory brands based on e.g. bentonite in order to remove these objectionable colour generating impurities. The clay-treatment stage as hitherto and currently practised invariably operates at moderately elevated temperatures, typically in the range of from 185° C. to 220° C., and at such elevated pressure as is necessary to maintain a liquid aromatics phase. Since neither the solvent extraction stage preceding the clay-treatment stage nor the fractional distillation stage which follows require such elevated temperature and pressure, preheating and post-cooling facilities for the aromatics stream which are specific to the demands of the clay-treatment stage need to be provided.

We have now found that the use of elevated temperature, indeed of a temperature above that required for the feed to the fractional distillation train, is not an essential requirement for successful clay-treatment. We have discovered that the colour-generating impurities which, in the absence of clay-treatment, tend to be carried over into the product aromatic hydrocarbons at objectionable levels, are removable by a procedure which includes as an important element oligomerisation/polymerisation of these impurities at active sites of a suitable clay or equivalent material at temperatures as low as, say, 95 to 125° C. Accordingly, by the selection of a suitable solid contact body the so-called clay-treatment stage may be operated at low temperature and at a sufficient pressure to maintain the aromatic hydrocarbons in the liquid phase and may conveniently be integrated as regards stream heating facilities with the fractional distillation train in that a single provision of stream heating facilities in advance of the clay-treatment stage may satisfactorily serve as feed preheater for the clay-treatment stage and also, given proper measures to prevent undue heat loss in intervening transit (including passage through the clay-treatment stage), as the preheater for the feed to the fractional distillation train.

The solid contact body used in the so-called "clay-treatment" stage should be a material active at a temperature below 125° C., preferably in the range 95 to 125° C., for the catalytic oligomerisation/polymerisation of colour-forming olefinic impurities in the aromatics stream which is passed from the solvent extraction stage for subsequent fractional distillation. The material may be, or be derived from, naturally occurring clay material or be a synthetic alumina- and/or silica-containing material, e.g. silica-magnesia, silica-zirconia, or any other acidic material of similar acidic character. It should possess acidic sites active to catalyse oligomerisation/polymerisation of olefinic substances. At least certain of the proprietory clays currently supplied for clay-treatment in the traditional high-temperature fashion have been found to be suitable, e.g. Filtrol 24 as supplied by Filtrol Corporation. It is anticipated, however, that the qualities required in a material for use in the present procedure will not be possessed by all clay materials which have been advocated as suitable for use in traditional clay-treatment stages, since their olefine oligomerisation capability may not invariably be sufficient or be sufficiently developed under the mild conditions used in the present procedure. It is, however, readily possible to test any chosen material for suitability.

The useful lifetime of solid contact materials used in the present procedure is expected to be at least as long in general as that of clay materials currently used in the high temperature treatment process.

The present invention is illustrated further by the following examples.

EXAMPLE 1

An extracted mixed aromatics stream having a Bromine index of approximately 100 mg./100 g. and which on fractionation gave a benzene product of acid wash colour test 9–10 (ASTM D848) was treated with Filtrol 24 clay under the following conditions in a small scale pilot plant:

Average bed temperature: 110° C.
Clay treater pressure: 11 p.s.i.g.
Weight hourly space velocity: 1.0 i.e. 1 ton/hr. of aromatics/ton of clay.

The benzene product distilled from the clay-treatment extract had an acid wash colour test which was always $<2.0$ and which generally was $<1.0$ (ASTM D848). The clay bed had a life (scaled up to a full size plant) of at least five months. The $C_7$ and $C_8$ aromatic products also had an acid wash colour test of $<2.0$ after clay treatment.

EXAMPLE 2

An extracted mixed aromatics stream having a Bromine index of approximately 70 mg./100 g. was treated at a rate of 70 tons/hour with Filtrol 24. The conditions were as follows:

Bed temperature: 110° to 115° C.
Clay treater pressure: ~10 p.s.i.g.
Weight hourly space velocity: 1.0.

The product removed from the clay-treatment extract had a Bromine index of only 5 mg./100 g.

We claim:

1. A process for the treatment of naphtha reformate consisting predominantly of mixed aromatic hydrocarbons which comprises extracting the aromatic hydrocarbons from the reformate using a selective solvent, treating the extracted mixed aromatic hydrocarbon stream to remove olefinic impurities therefrom by passing the stream of mixed aromatic hydrocarbons through a bed of material selected from the group consisting of a naturally-occurring clay material and a synthetic alumina- and/or silica-containing material at a temperature below 125° C. and at a pressure sufficient to maintain the stream of mixed aromatic hydrocarbons in the liquid phase whereby olefinic impurities are oligomerized or polymerized and thereafter fractionally distilling the so-treated aromatic hydrocarbon stream into its separate aromatic components using substantially the same temperature and pressure conditions as used in the purification process.

2. A process as claimed in claim 1 wherein the bed of material is at a temperature in the range of 95 to 115° C.

3. A process as claimed in claim 1 wherein the extracted mixed aromatic hydrocarbon stream is treated with a bed in the temperature range of 110° C.–115° C. and a pressure in the range of 10–11 p.s.i.g. and the weight hourly space velocity is about 1 ton/hr. of aromatics/ton of bed material.

4. A process as claimed in claim 1 in which the aromatic hydrocarbon stream is contacted with the bed of material at a temperature in the range 95 to 125° C.

References Cited

UNITED STATES PATENTS

| | | | |
|---|---|---|---|
| 3,400,169 | 9/1968 | Eng et al. | 260—674 |
| 2,473,206 | 6/1949 | Jones | 208—260 |
| 2,778,863 | 1/1957 | Maisel et al. | 260—674 R |

DELBERT E. GANTZ, Primary Examiner
J. M. NELSON, Assistant Examiner

U.S. Cl. X.R.

260—674 SE

PO-1050
(5/69)

UNITED STATES PATENT OFFICE
CERTIFICATE OF CORRECTION

Patent No. 3,835,037 Dated September 10, 1974

Inventor(s) John Anthony Fairweather and Ronald James Dalton

It is certified that error appears in the above-identified patent and that said Letters Patent are hereby corrected as shown below:

In the heading of the patent add:

-- Foreign Application Priority Data

July 27, 1971 Great Britain .... 35200/71--

Column 2, line 59, the clay treater pressure should read -- $\geq$11 p.s.i.g.--

Signed and sealed this 3rd day of December 1974.

(SEAL)
Attest:

McCOY M. GIBSON JR.
Attesting Officer

C. MARSHALL DANN
Commissioner of Patents